3,058,862
Patented Oct. 16, 1962

3,058,862
ADHESIVE AGENTS FOR POLYVINYL ALCOHOL PRODUCTS
Hisao Miyahara, Katsuaki Hirano, and Hideo Suzumura, Okayama-ken, and Koichi Nagano, Osaka-fu, Japan, assignors to Kurashiki Rayon Co., Ltd., Okayama Prefecture, Japan, a corporation of Japan
No Drawing. Filed Aug. 12, 1959, Ser. No. 833,148
Claims priority, application Japan Aug. 12, 1958
6 Claims. (Cl. 154—46)

This invention relates to the preparation of improved adhesive solutions for bonding together polyvinyl alcohol products such as mouldings, films and sheets. It relates especially to a method of improving the adhesive properties of such solutions so as to give improved bond strength.

Adhesive agents for bonding together plastic polyvinyl alcohol products have been prepared by dissolving zinc chloride in an organic liquid which is a non-solvent for polyvinyl alcohol. Methanol, ethanol or acetone, or mixed solutions of these solvents, with water added as required to dissolve the zinc chloride, are used.

When the surfaces of the polyvinyl alcohol plastic materials which are to be adhered together are coated with these adhesive solutions and allowed to stand, a swelling of the coated surfaces takes place. Pressing together these swelled surfaces causes formation of a firm adhesive bond.

These adhesive solutions, however, have the disadvantage of a very low viscosity. A 40% solution of zinc chloride in the following solvents has the viscosity indicated at 30° C.:

| | Centipoises |
|---|---|
| Water | 1.2 |
| Acetone | 1.5 |
| Methanol | 2.8 |

In the case of any adhesive solution having a low viscosity, excessive exudation of the solution takes place when it is applied to the adhering surfaces and the surfaces are pressed together for adhesion. This results in useless deformation due to swelling, making it difficult to attain smooth surfaces on adhesion.

Moreover, the water which is present in the zinc chloride solutions, as well as any excessive water content of the polyvinyl alcohol plastic materials which are to be stuck together, may delay the development of adhesion strength at the initial stage, after the coated surfaces are pressed together for adhesion. Such adhesive agents are particularly unsuitable for application in cases where the operations must be completed in a short period of time, for example, in the high speed adhesion of thin films of polyvinyl alcohol using an automatic bag manufacturing machine. In order to avoid these defects it is sometimes necessary at the time of application to exercise control of such factors as the quantity of the adhesive agent to be used, moisture control of the materials to be stuck together, setting time, setting temperature, etc.

A principal object of this invention is to provide improved adhesive solutions for bonding together polyvinyl alcohol products which will have improved viscosity and give improved surface properties to the bonded material.

Another object of the invention is to provide adhesive solutions for bonding together polyvinyl alcohol products which will have improved initial bond strength so as to be useful in bonding operations which must be completed in a short period of time, as well as improved final bond strength.

Other objects and advantages of the invention will be apparent from a consideration of the specification and claims.

It has been discovered that the viscosity of solutions of adhesive agents may be regulated, and the adhesion strength at the initial stage after pressing together the coated surfaces greatly improved by adding polyvinyl alcohol dissolved in a small quantity of water to the adhesive solutions prepared by dissolving zinc chloride in organic liquids, such as methanol, ethanol and acetone, which are miscible with water but which are non-solvents for polyvinyl alcohol. The viscosity of such solutions may be varied within wide limits by using polyvinyl alcohol having different degrees of polymerization, by varying the amount of polyvinyl alcohol used, or by varying the water content of the solvent used.

Table I shows the effect on the viscosity of the adhesive solution resulting from the addition of partially hydrolyzed and completely hydrolyzed polyvinyl alcohol having different degrees of polymerization. These solutions contained 2% polyvinyl alcohol by weight and 40% zinc chloride by weight in a solvent mixture containing water and methanol in the proportion of 75 parts of methanol per 25 parts of water. The partially hydrolyzed polyvinyl alcohol had a degree of hydrolysis of 88 molar percent.

TABLE I

| Average degree of polymerization of polyvinyl alcohol | Viscosity of solutions at 30° C. (centipoise) | |
|---|---|---|
| | Solutions containing 2% fully hydrolyzed polyvinyl alcohol | Solutions containing 2% partially hydrolyzed polyvinyl alcohol |
| No polyvinyl alcohol addition | 2.4 | 2.4 |
| 500 | 10 | 6 |
| 1,000 | 18 | 13 |
| 1,700 | 35 | 21 |
| 2,500 | 64 | 32 |

Table II shows the variation in the viscosity of the zinc chloride adhesive solution which results when varying the water content of the solvent. These solutions contained completely saponified polyvinyl alcohol having an average degree of polymerization of 1700 and 40% by weight of zinc chloride in a solvent mixture of methanol and water in the proportions indicated.

TABLE II

| Relative proportions of solvents (parts by weight) | | Viscosity of solutions at 30° C. (centipoise) | | | |
|---|---|---|---|---|---|
| Methanol | Water | Polyvinyl alcohol concentration: 0% | Polyvinyl alcohol concentration: 1% | Polyvinyl alcohol concentration: 2% | Polyvinyl alcohol concentration: 3% |
| 90 | 10 | 2.6 | 40 | 120 | 270 |
| 80 | 20 | 2.5 | 23 | 66 | 190 |
| 70 | 30 | 2.3 | 12 | 40 | 120 |
| 60 | 40 | 2.2 | 8 | 18 | 45 |

From the above table it is seen that the zinc chloride adhesive solutions containing polyvinyl alcohol have a higher viscosity the lower the water content of the solvent. With an increase in the quantity of the polyvinyl alcohol the amount of water required to dissolve the polyvinyl alcohol becomes larger.

The viscosity of the zinc chloride solution may be raised sufficiently by adding a solution of a polyvinyl alcohol polymer having high viscosity. The quantity of polyvinyl alcohol to be added is an amount less than 15% by weight of the quantity of zinc chloride used. Ordinarily 2% to 3% of polyvinyl alcohol is sufficient.
Additionally, when the viscosity of the adhesive is increased by the addition of polyvinyl alcohol, there also results an increase in adhesive strength at the initial stage of adhesion of the polyvinyl alcohol coated surfaces even though the adhesive agent contains water.

The addition of a viscosity promoter other than polyvinyl alcohol may cause a deterioration of the adhesive properties of the zinc chloride solution for the polyvinyl alcohol plastics.

By appropriate selection of the degree of polymerization of the polyvinyl alcohol, determination of the quantity of the polyvinyl alcohol to be added and variation of the water content of the solution, zinc chloride adhesive solutions will be obtained which have greater adhesiveness than is possible with simple solutions of zinc chloride in organic solvents such as methanol, ethanol and acetone. Moreover, it is unnecessary to take into consideration the quantity of water contained in the polyvinyl alcohol surfaces to be adhered with the adhesive agent. The adhesive solution which is properly adjusted for viscosity by the use of polyvinyl alcohol will have good extensibility on the adhering surfaces. No exudation of the adhesive agent from the adherent surfaces and no deformation of the adherent surfaces will be caused even when the surfaces are pressed together for adhesion immediately after the application of the adhesive agent to the surfaces. Moreover, if the polyvinyl alcohol materials are allowed to stand for a long period of time after the application of the adhesive coating before they are pressed together for adhesion, the adhesive solution applied on the material will satisfactorily maintain its adhesiveness, and a strong bond may be easily brought about merely by pressing the surfaces together.

The following examples are given to illustrate our invention and are not intended to limit the invention in any way. All figures are given by weight.

*Example 1*

Adhesive solutions containing 40% zinc chloride and 2% polyvinyl alcohol were prepared by mixing together a concentrated solution of zinc chloride in aqueous methanol with a concentrated aqueous solution of completely hydrolyzed polyvinyl alcohol having an average degree of polymerization of 1700. These solutions were applied to films of polyvinyl alcohol which were 0.02 mm. thick and which contained 10% of a hygroscopic plasticizer and 8% of water in such a manner that the quantity of the non-volatile substances in the adhesive solution applied were about 8 to 9 grams per square meter of applied surface. The films were lightly pressed together for adhesion 30 seconds after the application of the adhesive agent. The adhesion strength was measured by the tensile separation test at the end of stated periods of time after pressing the materials together. The following table shows the adhesive strength data after several time intervals, using adhesive solutions prepared from an aqueous methanol solution containing the relative proportions of the water and methanol which are indicated.

TABLE III

| Relative proportions of solvents (parts by weight) | | Adhesion strength at the initial stage after pressing together (g./cm.²) | | | |
|---|---|---|---|---|---|
| Methanol | Water | 1 minute after press | 2 minutes after press | 5 minutes after press | 60 minutes after press |
| 90 | 10 | 160 | 220 | 310 | 395 |
| 75 | 25 | 120 | 200 | 280 | 390 |
| 65 | 40 | 110 | 180 | 215 | 320 |

These results are to be compared with the results of strength measuring tests carried out with adhesive solutions containing 40% zinc chloride but no polyvinyl alcohol, as shown in the following table:

TABLE IV

| Relative proportions of solvents (parts by weight) | | Adhesion strength at the initial stage of pressing together (g./cm.²) | | | |
|---|---|---|---|---|---|
| Methanol | Water | 1 minute after press | 2 minutes after press | 5 minutes after press | 60 minutes after press |
| 97 | 3 | 120 | 195 | 270 | 400 |
| 75 | 25 | 60 | 155 | 200 | 320 |

*Example 2*

Adhesive solutions containing 30% zinc chloride and 3% polyvinyl alcohol were prepared by mixing together a concentrated solution of zinc chloride in an aqueous methanol solution with a concentrated aqueous solution of a completely hydrolyzed polyvinyl alcohol having an average degree of polymerization of 1700. These solutions were applied to sheets of polyvinyl alcohol which were 2 mm. thick and which contain 19% of a hygroscopic plastic and 11% of water. The sheets were stuck together in such a manner that the quantity of non-volatile substances in the adhesive solutions were 12 to 14 grams per square meter of applied surface. Thirty minutes after the application the films were pressed together for adhesion under the load of one kilogram per square centimeter of the area to be stuck together. The following table shows the adhesive strength, measured by the tensile shear test, at several time intervals after pressing the sheets together for adhesion. The adhesive solutions contained the relative proportions of water and methanol which are indicated in the table.

TABLE V

| Portions of solvents (parts by weight) | | Adhesion strength at the initial stage after pressing together for adhesion (kg./cm.²) | | | |
|---|---|---|---|---|---|
| Methanol | Water | 1 hour after press | 3 hours after press | 6 hours after press | 24 hours after press |
| 90 | 10 | 1.8 | 4.2 | 5.7 | 38.8 |
| 80 | 20 | 2.0 | 4.8 | 4.7 | 39.4 |
| 65 | 35 | 3.1 | 11.0 | 16.5 | 42.1 |

What we claim is:

1. An improved adhesive solution adapted for bonding together polyvinyl alcohol bodies and comprising zinc chloride, an organic solvent which is miscible with water but which is a non-solvent for polyvinyl alcohol, polyvinyl alcohol, and sufficient water to maintain said polyvinyl alcohol in solution in said improved adhesive solution.

2. The improved adhesive solution of claim 1 wherein the polyvinyl alcohol is present in an amount less than 15% by weight based on the zinc chloride.

3. The method of bonding together polyvinyl alcohol materials which comprises coating the surfaces of said polyvinyl alcohol materials to be bonded together with an adhesive solution comprising zinc chloride, an organic solvent which is miscible with water but which is a non-solvent for polyvinyl alcohol, polyvinyl alcohol, and sufficient water to maintain the polyvinyl alcohol in solution in said adhesive solution, and pressing together the coated surfaces.

4. An assembly of polyvinyl alcohol bodies bonded together by an adhesive which is the residue of a fluid adhesive solution comprising zinc chloride, an organic solvent which is miscible with water but which is a non-solvent for polyvinyl alcohol, polyvinyl alcohol, and sufficient water to maintain said polyvinyl alcohol in solution in said fluid adhesive solution.

5. An assembly of polyvinyl alcohol bodies bonded together by an adhesive which is the residue of a fluid adhesive solution comprising zinc chloride, an organic solvent which is miscible with water but which is a non-solvent for polyvinyl alcohol, polyvinyl alcohol, and sufficient water to maintain said polyvinyl alcohol in solution in said fluid adhesive solution, said polyvinyl alcohol being present in an amount less than 15% by weight based on the zinc chloride.

6. An improved adhesive solution adapted for bonding together polyvinyl alcohol bodies and comprising zinc chloride, methanol, polyvinyl alcohol and water, the amount of water being sufficient to maintain said polyvinyl alcohol in solution but not exceeding 40% by weight of the total amount of solvents, and the amount of polyvinyl alcohol being at least 1% of the total weight of the solution but less than 15% of the weight of zinc chloride.

References Cited in the file of this patent

UNITED STATES PATENTS

| | | |
|---|---|---|
| 2,408,377 | Dangelmajer | Oct. 1, 1946 |
| 2,679,489 | Cunningham | May 25, 1954 |
| 2,924,535 | Schaefer | Feb. 9, 1960 |

OTHER REFERENCES

Materials in Design Engineering, January 1958, pages 129–134.

The Technology of Adhesives by Delmonte, published by Reinhold Publishing Company, New York, N.Y., 1947, pages 128, 405.